(12) United States Patent
Silverstein et al.

(10) Patent No.: US 11,436,814 B2
(45) Date of Patent: *Sep. 6, 2022

(54) ADJUSTED OVERLAID IMAGES IN SCENES

(71) Applicant: Meta Platforms Technologies, LLC, Menlo Park, CA (US)

(72) Inventors: Barry David Silverstein, Kirkland, WA (US); Romain Bachy, Seattle, WA (US); Edward Buckley, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/328,998

(22) Filed: May 24, 2021

(65) Prior Publication Data

US 2021/0279972 A1    Sep. 9, 2021

Related U.S. Application Data

(63) Continuation of application No. 16/710,153, filed on Dec. 11, 2019, now Pat. No. 11,049,330.

(60) Provisional application No. 62/867,525, filed on Jun. 27, 2019.

(51) Int. Cl.
| | |
|---|---|
| *G06T 19/20* | (2011.01) |
| *G06T 19/00* | (2011.01) |
| *G02B 27/01* | (2006.01) |
| *G06T 7/70* | (2017.01) |

(52) U.S. Cl.
CPC ............ *G06T 19/20* (2013.01); *G02B 27/017* (2013.01); *G06T 7/70* (2017.01); *G06T 19/006* (2013.01); *G02B 2027/014* (2013.01); *G02B 2027/0112* (2013.01); *G06T 2207/10024* (2013.01)

(58) Field of Classification Search
CPC ......... G06T 19/20; G06T 7/70; G06T 19/006; G06T 2207/10024; G02B 27/017; G02B 2027/0112; G02B 2027/014
See application file for complete search history.

(56) References Cited

U.S. PATENT DOCUMENTS

| | | | |
|---|---|---|---|
| 9,734,635 B1 * | 8/2017 | Gorumkonda | ..... H04N 5/23229 |
| 10,218,946 B1 | 2/2019 | McCoy et al. | |
| 10,529,300 B1 | 1/2020 | Walters et al. | |
| 10,572,988 B1 * | 2/2020 | Chaturvedi | ........... G06T 7/0006 |
| 2006/0050087 A1 | 3/2006 | Tanimura et al. | |
| 2010/0296699 A1 | 11/2010 | Pupilli et al. | |
| 2010/0321409 A1 | 12/2010 | Komori et al. | |
| 2013/0021373 A1 | 1/2013 | Vaught et al. | |

(Continued)

FOREIGN PATENT DOCUMENTS

KR     20160081698 A     7/2016

OTHER PUBLICATIONS

International Searching Authority, Patent Cooperation Treaty, European Application No. PCT/US2020/037090, dated Sep. 10, 2020, 23 pages.

(Continued)

*Primary Examiner* — David T Welch
(74) *Attorney, Agent, or Firm* — Freestone Intellectual Property Law PLLC; Aaron J. Visbeek

(57) ABSTRACT

Adjusted overlaid images are generated in response to at least one color reference object or color reference point. A display is driven to present the adjusted overlaid image.

11 Claims, 10 Drawing Sheets

(56) References Cited

U.S. PATENT DOCUMENTS

| | | |
|---|---|---|
| 2013/0278631 A1 | 10/2013 | Border et al. |
| 2015/0207960 A1* | 7/2015 | Tomlinson ................ G06T 7/74 |
| | | 382/167 |
| 2016/0225190 A1* | 8/2016 | Yamazaki ............. G06F 1/1686 |
| 2018/0053284 A1* | 2/2018 | Rodriguez ............. G06T 5/006 |
| 2018/0129050 A1 | 5/2018 | Hayashi et al. |
| 2019/0266976 A1 | 8/2019 | Wyble |
| 2019/0278098 A1 | 9/2019 | Prest et al. |
| 2020/0013151 A1 | 1/2020 | Atkins et al. |
| 2020/0035031 A1 | 1/2020 | Konings et al. |
| 2020/0242322 A1 | 7/2020 | Weaver et al. |

OTHER PUBLICATIONS

International Searching Authority, Patent Cooperation Treaty, European Application No. PCT/US2020/037090, dated Nov. 3, 2020, 25 pages.

Nikon, Learn & Explore: Intermediate, 3D Color Matrix Metering II, https://www.nikonusa.com/en/learn-and-explore/a/products-and-innovation/3d-color-matrix-metering-ii.html (Jun. 2019), 2 pages, Dec. 10, 2019.

Zaida, Qasim, Identification of Illuminant and object colors: heuristic-based algorithms, Optical Society of America, Optical Society of America, vol. 15, No. 7, 10 pages, Jul. 1998.

\* cited by examiner

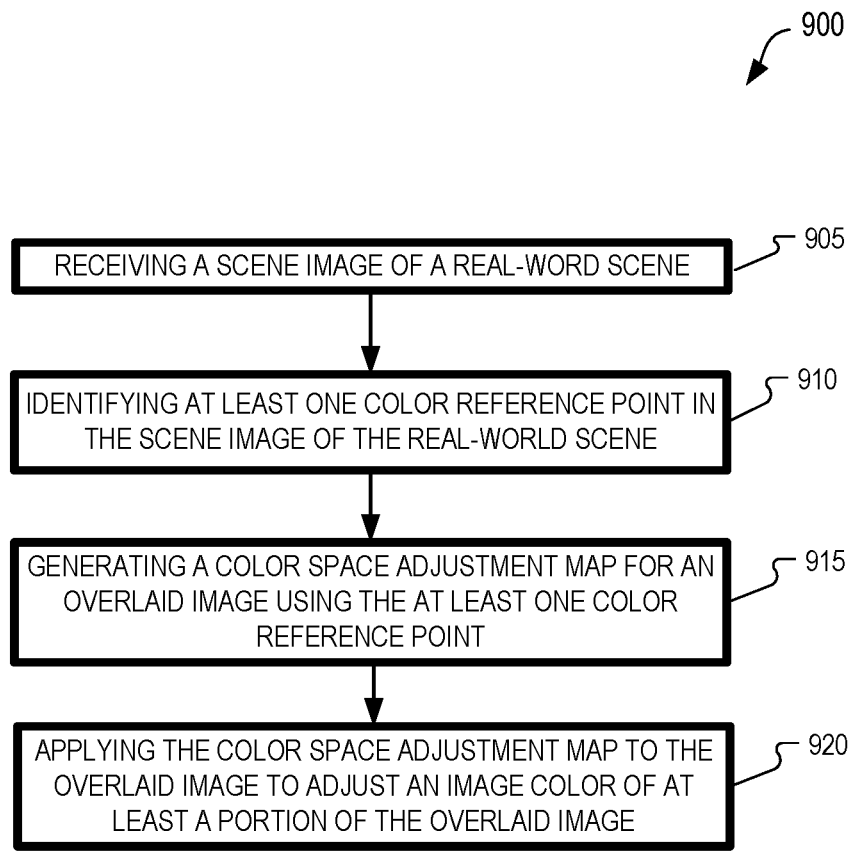

ADJUSTED OVERLAID IMAGES IN SCENES

CROSS REFERENCE TO RELATED APPLICATIONS

This application claims priority to U.S. non-provisional application Ser. No. 16/710,153 filed Dec. 11, 2019, which claims benefit to U.S. Provisional Application No. 62/867,525, entitled "Color Reference for Overlaid Images" filed Jun. 27, 2019. U.S. non-provisional Application No. 16/710,153 and U.S. Provisional Application No. 62/867,525 are expressly incorporated herein by reference in their entirety.

BACKGROUND INFORMATION

In augmented reality (AR), mixed reality (MR), and/or a hybrid reality, artificial reality content may include computer generated content combined with real-world content. In these experiences, it may be desirable for the computer-generated content that is overlaid with the real-world content to be consistent with the lighting and color environment of the external world.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 9 illustrates an example flowchart of a process of color adjusting an overlaid image from color reference objects, in accordance with an embodiment of the disclosure.

DETAILED DESCRIPTION

Embodiments of generating overlaid images with respect to color references are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In augmented reality (AR), mixed reality (MR), and/or a hybrid reality, a user may encounter different lighting conditions in real-world scenes. For example, a real-world scene may be illuminated by sunlight, cold-cathode fluorescent lamp(s), sodium lights, or LEDs with various color temperatures. These different illumination sources may illuminate the real-world scene with light having various color temperature and color tints. Adjusting a color of a computer-generated overlaid image that is presented to a user overlaying real-world scenes would make the overlaid image more consistent and believable in the experience. Therefore, when the real-world scene is illuminated with bluish CCFL light, the pixel values of the overlaid image may be adjusted by a difference vector between a white light reference point and the bluish light illuminating the real-world scene. By adjusting the color of the objects or animals of the overlaid image to be more similar to what they would be while illuminated by similarly colored light illuminating the real-world scene, the user experience is improved. These and other embodiments are described in more detail in connections with FIGS. 1-9.

Figure 1:
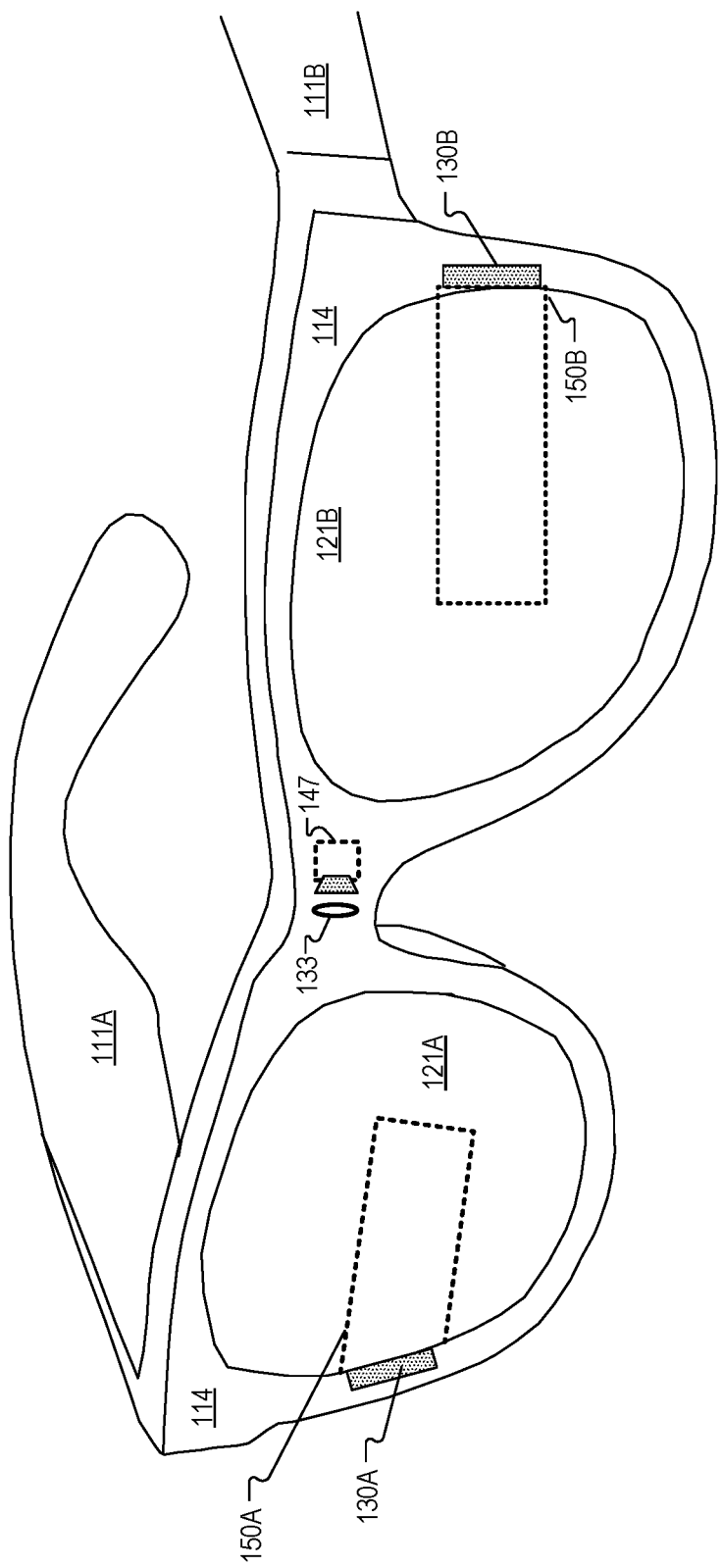
FIG. 1 illustrates an example head mounted display (HMD) including a color reference object and a light sensor, in accordance with an embodiment of the disclosure.

FIG. 1 illustrates an example head mounted display (HMD) 100 including a color reference object 133 and a light sensor 147, in accordance with an embodiment of the disclosure. HMD 100 includes frame 114 coupled to arms 111A and 111B. Lenses 121A and 121B are mounted to frame 114. Lenses 121 may be prescription lenses matched to a particular wearer of HMD or non-prescription lenses. The illustrated HMD 100 is configured to be worn on or about a head of a user of the HMD.

In FIG. 1, each lens 121 includes a waveguide 150 to direct image light generated by a display 130 to an eyebox area for viewing by a wearer of HMD 100. Display 130 may include an LCD, an organic light emitting diode (OLED) display, micro-LED display, quantum dot display, pico-projector, or liquid crystal on silicon (LCOS) display for directing image light to a wearer of HMD 100.

The frame 114 and arms 111 of the HMD 100 may include supporting hardware of HMD 100. HMD 100 may include any of processing logic, wired and/or wireless data interface for sending and receiving data, graphic processors, and one or more memories for storing data and computer-executable instructions. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

Lenses 121 may appear transparent to a user to facilitate augmented reality or mixed reality where a user can view scene light from the external environment around her while also receiving image light directed to her eye(s) by waveguide(s) 150. Consequently, lenses 121 may be considered (or include) an optical combiner. When lenses 121 are optical combiners, they may introduce some amount of color distortion that modifies the real-world scene and the compensation techniques described below may account for color distortion introduced by lenses 121, in some embodiments. In some embodiments, image light is only directed into one eye of the wearer of HMD 100. In an embodiment, both displays 130A and 130B are included to direct image light into waveguides 150A and 150B, respectively. Displays 130A and 130B (combined with waveguides 150A and 150B) may be configured to generate overlaid images for overlaying with real-world scenes.

The example HMD 100 of FIG. 1 includes a color reference object 133 and a light sensor 147. Color reference object 133 is configured to receive scene light and direct the scene light to light sensor 147 so that light sensor 147 can capture a light measurement of the scene light from an external environment of the HMD. Light sensor 147 may include a complementary metal-oxide semiconductor (CMOS) image sensor, in some embodiments. Pixel values of an image captured by the image sensor may be used to determine the color of the scene light. Light sensor 147 may include a color sensor chip including three or more photodiodes disposed under red, green, and blue color filters to measure the color of the scene light. A fourth photodiode may have no color filter disposed over it. The color sensor chip may output the digital or analog information that can be used to determine a color of the scene light.

Color reference object 133 may be similar to a "gray card" used in film (movies) or photography to provide a middle gray reference point as a calibrated color value or a white card to provide a white color reference point as a calibrated color value. Color reference object 133 could be another color having a calibrated color value. The color reference object 133 may be encapsulated in a transparent protection barrier so that it is protected from the outside environment.

When the color sensor captures a light measurement of the scene light, the light measurement can be analyzed to determine a color difference (if any) between the light measurement and a calibrated color value that was a light measurement taken in a known and controlled illumination environment. Therefore, a color delta of the scene light can be measured by calculating a difference between a light measurement captured by the light sensor in an unknown light environment and a calibrated color value of the color reference object measured by the light sensor in a known illumination environment. The known light environment may be a white light source having known color coordinates in a color space chromaticity diagram or other perception-matched color space, for example.

Figure 2:
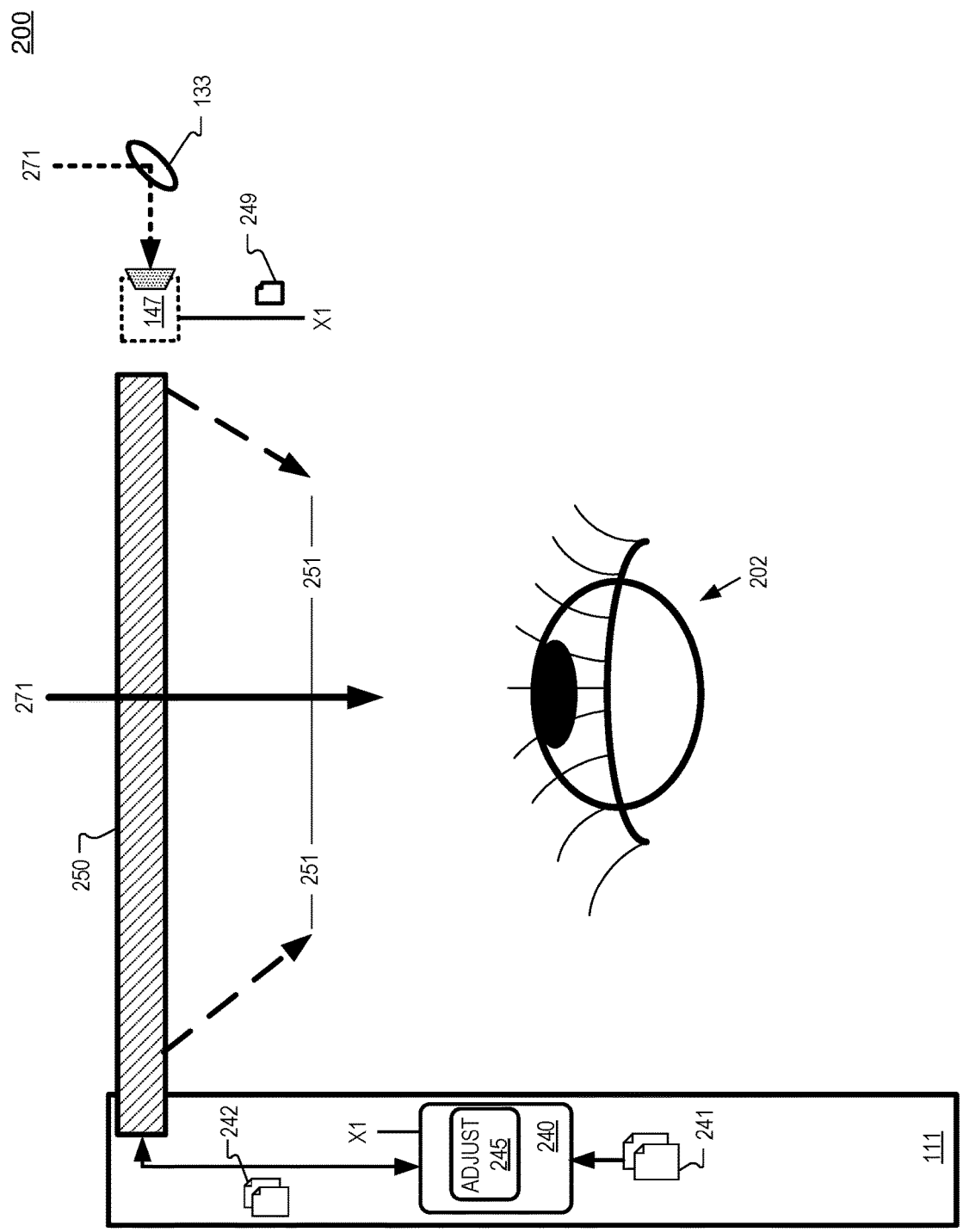
FIG. 2 illustrates a top view of an optical system for presenting an overlaid image to an eye of a user of an HMD where the overlaid image is overlaid with a real-world scene, in accordance with an embodiment of the disclosure.

FIG. 2 illustrates a top view of an optical system 200 for presenting an overlaid image to an eye 202 of a user of an HMD where the overlaid image is overlaid with a real-world scene, in accordance with an embodiment of the disclosure. Optical system 200 includes a display 250, a light sensor 147, and a color reference object 133. Display 250 presents virtual images included in display light 251 to eye 202 while eye 202 can also view scene light 271 from an external environment of optical system 200. Hence, the virtual images included in display light 251 are referred to as overlaid images because they overlay real-world scene light 271. All or a portion of display 250 may be transparent or semi-transparent to allow scene light 271 from an external environment of the user to become incident on eye 202 so that a user can view her external environment in addition to viewing overlaid images.

In some embodiments, light sensor 147 captures light measurements of color reference object 133 that is illuminated by scene light 271. Color reference object 133 is configured to receive the scene light to light sensor 147 so that light sensor can image the color reference object while it is illuminated by scene light 271. Light sensor 147 is communicatively coupled to processing logic 240 via communication channel X1, in the illustrated embodiment. Processing logic 240 may initiate a light measurement by sending an initiation signal to light sensor 147 via communication channel X1. Processing logic 240 may receive light measurement data 249 via communication channel X1. Light measurement data 249 may be an image including rows and columns of pixel values. Light measurement data 249 may include analog or digital representations of chromaticity from a color sensor chip, in some embodiments. Processing logic 240 may be included in an arm 111 of an HMD, for example.

Light measurement data 249 may be provided to overlaid image adjustment engine 245 of processing logic 240. Processing logic 240 and overlaid image adjustment engine 245 is configured to receive overlaid image(s) 241 and generate adjusted overlaid images 242 with overlaid image adjustment engine 245. Processing logic 240 may be configured to determine a color space adjustment value in response to light measurement data 249 and adjust an image color of at least a portion of the received overlaid images 241 in response to the color space adjustment value. In an embodiment, determining the color space adjustment value in response to the light measurement includes comparing a calibrated color value of the color reference object 133 to the light measurement data 249 of the color reference object 133 when the color reference object 133 is illuminated with scene light 271. Processing logic 240 is communicatively coupled to display 250 and processing logic 240 may drive display 250 to present the adjusted overlaid images 242 in display light 251 based at least in part on the light measurement data 249.

Overlaid image(s) 241 may be received from an on-board memory (not illustrated) included in HMD 100, for example. Images 241 may also be wirelessly transmitted to the HMD and received by a wireless interface (not illustrated) of the HMD.

Figure 3:
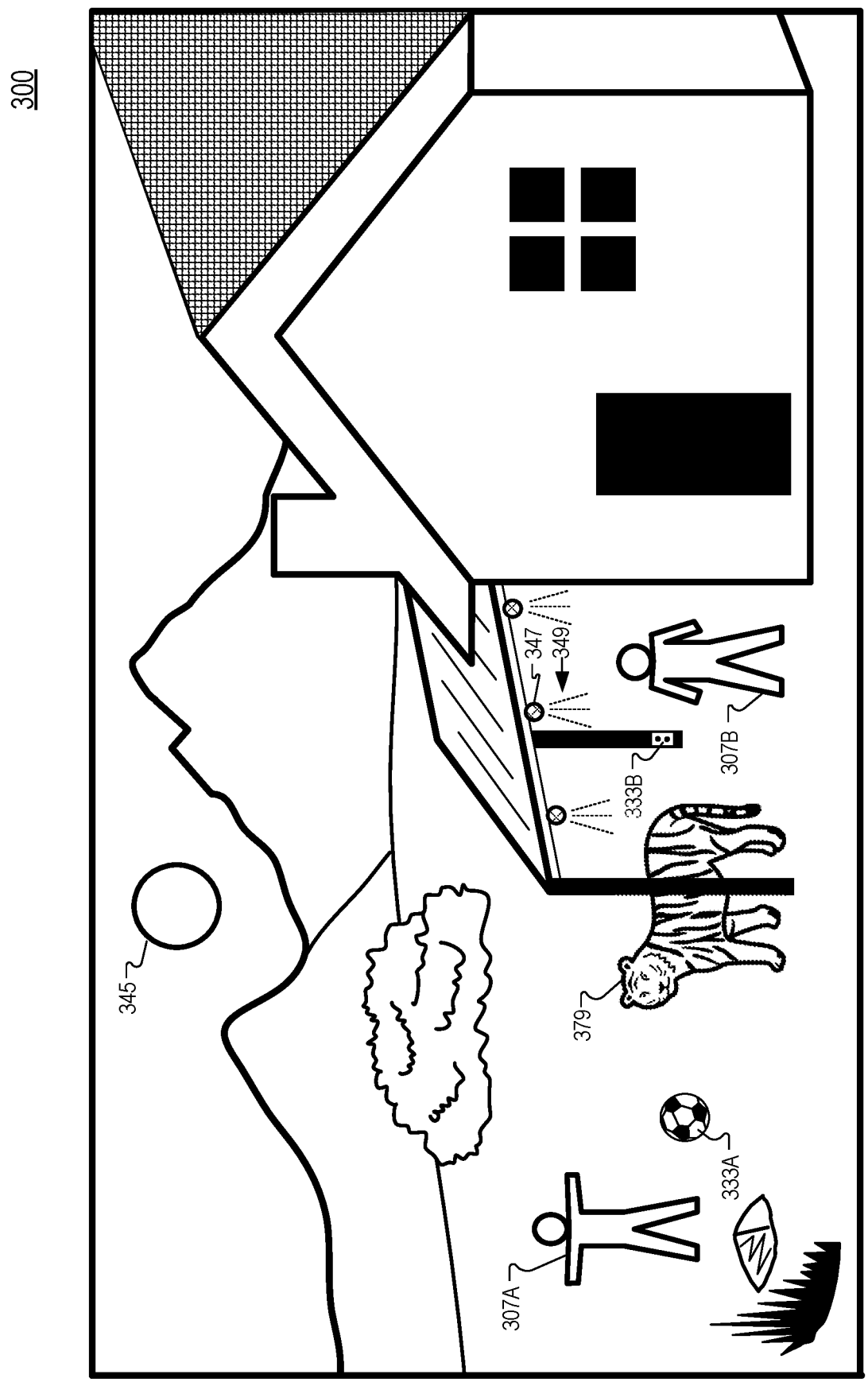
FIG. 3 illustrates an overlaid image of a tiger overlaying a real-world scene, in accordance with an embodiment of the disclosure.

FIG. 3 illustrates an overlaid image 379 of a tiger overlaying a real-world scene 300, in accordance with aspects of the disclosure. Some real-world scenes viewed by a user of an HMD may have consistent illumination light with substantially uniform color. For example, an outdoor scene may be illuminated by sunlight having uniform color or an indoor scene may be illuminated by similar light source(s) emitting light of the same color over an entire indoor scene. Some real-world scenes viewed by a user of an HMD may include illumination light that is non-uniform in color or varies over different zones of the real-world scene. In real-world scene 300, subject 307A is illuminated by sunlight from sun 345 and subject 307B is illuminated by light 349 from second illumination sources 347. The second illumination source 347 may be CCFLs generating bluish light 349 that illuminates subject 307B and subject 307A may be illuminated with a reddish light from sun 345. Therefore, even if subject 307A and 307B are wearing the same clothes and have similar skin color, they will be perceived by a user of an HMD as having slightly different colors.

FIG. 3 includes a first color reference point 333A and a second color reference point 333B. The first color reference point 333A is a white panel of a soccer ball. The second color reference point is a white outlet cover. Other objects and other colors may be used as color reference points, of course. Color reference points 333 may be identified in scene 300 by capturing a scene image of scene 300 using an image sensor of an HMD and then identifying the whitest objects by searching for interconnected groups of white (or close to white) pixels and assuming that the object is in fact white. If the whitest object in the image reflects a reddish light (as captured by pixel data in the image), the white object (and objects in the near vicinity) may be assumed to be illuminated by a reddish light such as sunlight. In other embodiments of the disclosure, a color reference point is identified by matching a portion of a scene image of scene 300 (captured by an image sensor of an HMD) with a known object. For example, an outlet cover 333B has a shape and a contrast profile that could be identified using image processing matching algorithms. Some image processing matching algorithms may include matching objects or shapes of objects in scene 300 against a plurality of images of known objects. A panel portion of the soccer ball of color reference point 333A may also be identified using image processing match algorithms. Once an object is identified as a color reference point, a calibrated color value corresponding with the color reference point may be used as a baseline for determining what color of light is currently illuminating the identified object. For example, if an outlet cover 333B has a calibrated color value that is a particular color of white and the scene image pixels of the outlet cover 333B have chromaticity values closer to a bluer wavelength in a color space chart, it may be determined that color reference point 333B is being illuminated by blue-tinted light. At a high level, if a system can determine or identify the real or essential color of one object in a scene, the colors of other objects in the scene (or the portion of the scene being similarly illuminated) can be recovered and be known. This concept may be referred to as the intrinsic property of the object and recognizing corresponding surfaces under different illuminants could be used to estimate the illuminant.

Figure 4:
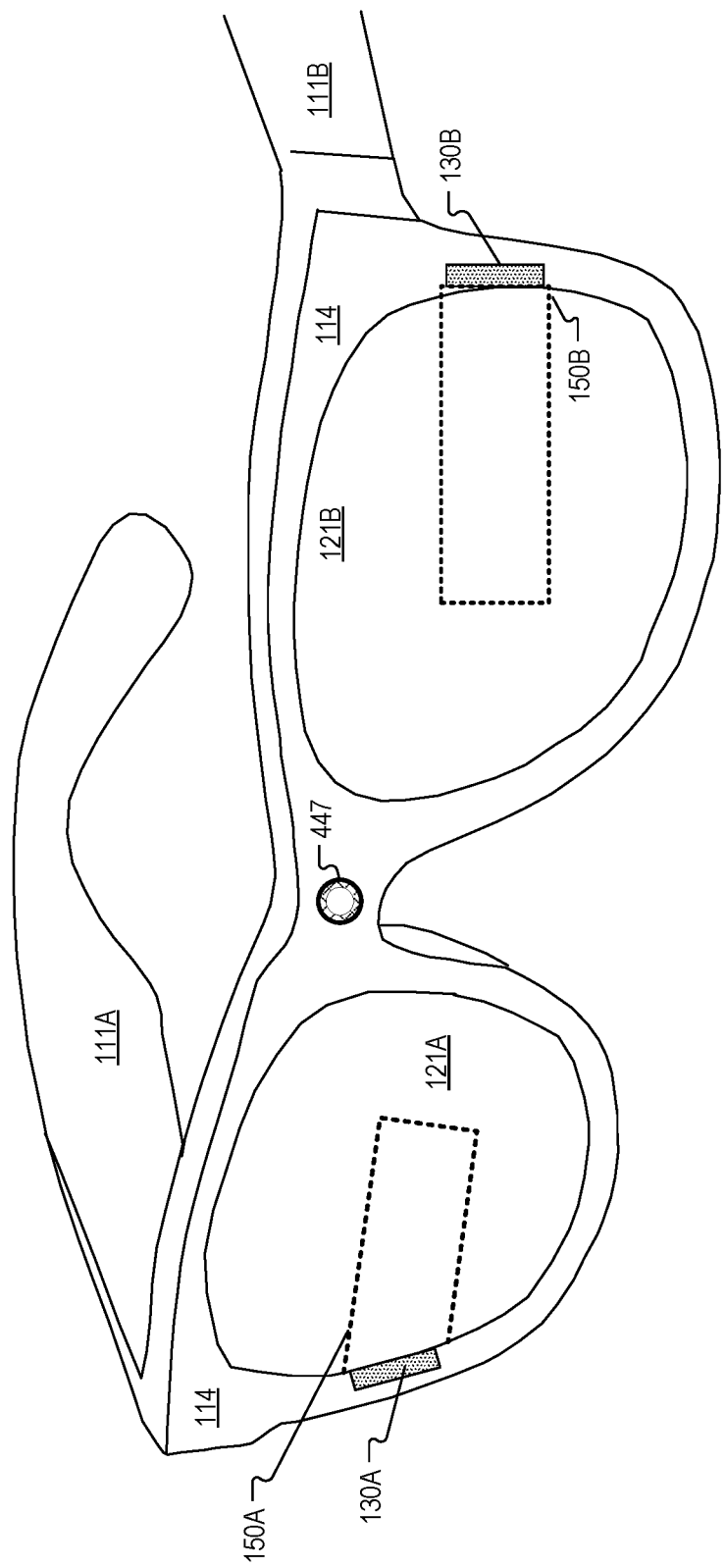
FIG. 4 illustrates an example head mounted display (HMD) including a forward-facing camera oriented to capture one or more scene images of a real-world scene of HMD, in accordance with an embodiment of the disclosure.

FIG. 4 illustrates an example head mounted display (HMD) 400 including a forward-facing camera 447 oriented to capture one or more scene images of a real-world scene of HMD 400, in accordance with an embodiment of the disclosure. Other elements of HMD 400 may be similar to HMD 100. Forward-facing camera 447 is illustrated as disposed in the middle of HMD 400, although camera 447 may be disposed to one side of the HMD 400. Additionally, more than one camera may be utilized in HMD 400 to capture scene images.

Figure 5:
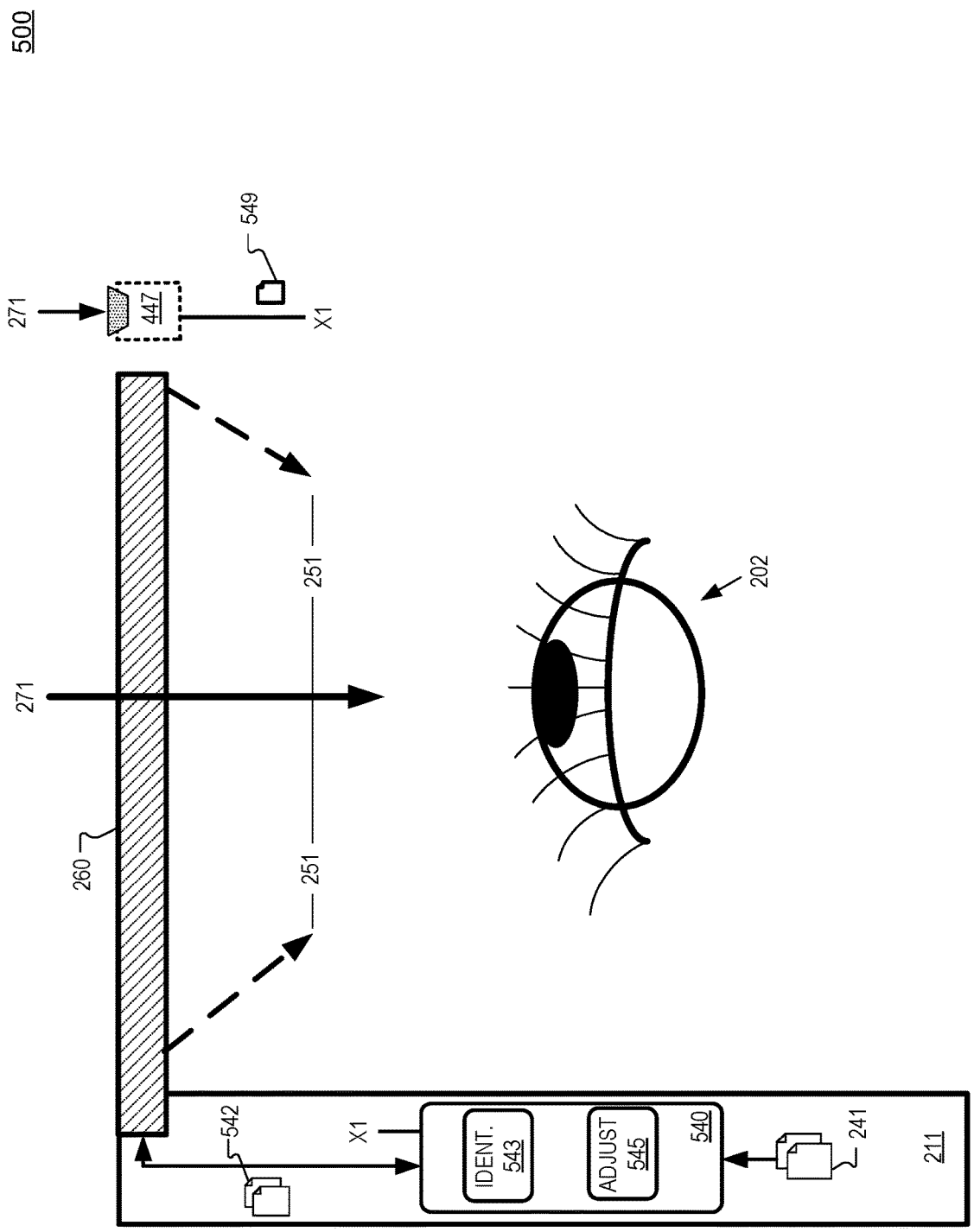
FIG. 5 illustrates a top view of an optical system for presenting an overlaid image to an eye of a user of an HMD where the overlaid image is overlaid with a real-world scene, in accordance with an embodiment of the disclosure.

In FIG. 5, camera 447 is configured to image scene light 271. Therefore, light measurement data 549 may include an image. Camera 447 may include a CMOS image sensor and lenses to focus scene light 271 onto an imaging plane of the image sensor. FIG. 5 illustrates a top view of an optical system 500 for presenting an overlaid image to an eye 202 of a user of an HMD where the overlaid image is overlaid with a real-world scene, in accordance with an embodiment of the disclosure. Optical system 500 includes a display 260, camera 447, and processing logic 540. Display 260 presents virtual images included in display light 251 to eye 202 while eye 202 can also view scene light 271 from an external environment of optical system 500. Hence, the virtual images included in display light 251 are referred to as overlaid images because they overlay real-world scene light 271. All or a portion of display 260 may be transparent or semi-transparent to allow scene light 271 from an external environment of the user to become incident on eye 202 so that a user can view her external environment in addition to viewing overlaid images.

Processing logic 540 may be configured to determine a color space adjustment value in response to light measurement data 549 and adjust an image color of at least a portion of the received overlaid images 241 in response to the color space adjustment value. Processing logic 540 is communicatively coupled to display 260 and processing logic 540 may drive display 260 to present the adjusted overlaid images 542 in display light 251 based at least in part on the light measurement data 549.

In some embodiments, camera 447 captures scene images of a real-world external environment of an HMD. Camera 447 is communicatively coupled to processing logic 540 via communication channel X1, in the illustrated embodiment. Processing logic 540 may initiate an image capture by sending an initiation signal to camera 447 via communication channel X1. Processing logic 540 may receive light measurement data 549 (e.g. scene images) via communication channel X1. Light measurement data 549 may be an image including rows and columns of pixel values. Processing logic 540 may be included in an arm 211 of an HMD, as illustrated.

Light measurement data 549 may be provided to color reference identification engine 543 to identify a color reference point of a scene image included in light measurement data 549. For example, color reference identification engine 543 may identify a white outlet cover (e.g. 333B in FIG. 3) as a color reference point or a white panel of a soccer ball (e.g. 333A) as a color reference point.

Figure 6A:
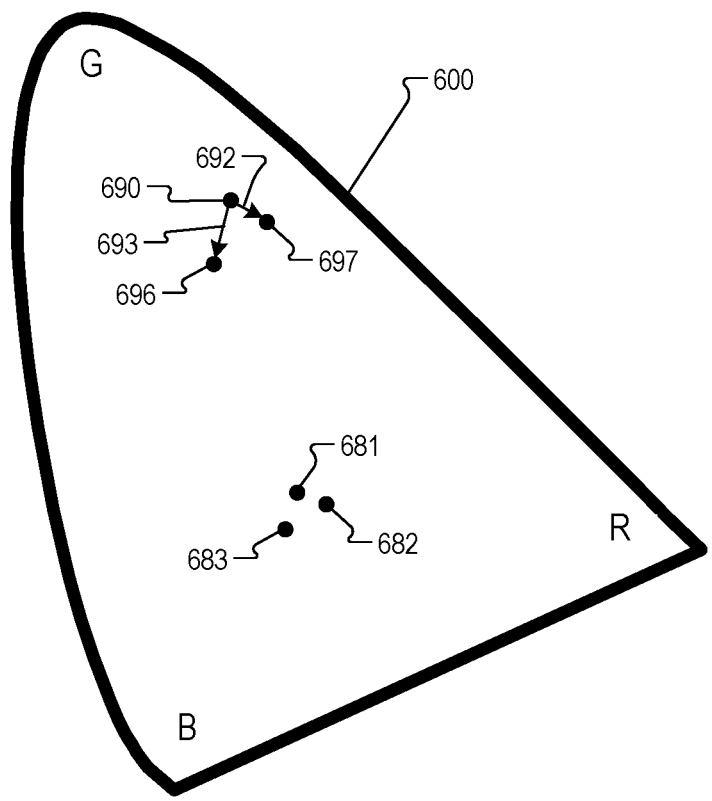
FIGS. 6A and 6B illustrate a color space chromaticity diagram and difference vectors, in accordance with an embodiment of the disclosure.

FIG. 6A illustrates a color space chromaticity diagram 600, in accordance with an embodiment of the disclosure. As is familiar to those skilled in the art, diagram 600 includes blue light wavelengths in the bottom left going to green light wavelengths at the top and continuing to red light wavelengths in the bottom right of diagram 600.

Calibrated color value 681 references a chromaticity coordinate within diagram 600. This calibrated color value may be associated with a color reference point such as the spectral reflectance of a white outlet cover of color reference point 333B under a known light source. When the color reference point is illuminated with blue light (from a CCFL source, for example), a scene image captured by camera 447 may associate pixel values of the color reference point with value 683. The chromaticity of value 683 has drifted toward blue compared to calibrated color value 681. When the color reference point is illuminated with reddish light (from a warm LED source or sunlight, for example), a scene image captured by camera 447 may associate pixel values of the color reference point with value 682. The chromaticity of value 682 has drifted toward red compared to calibrated color value 681.

Figure 6B:
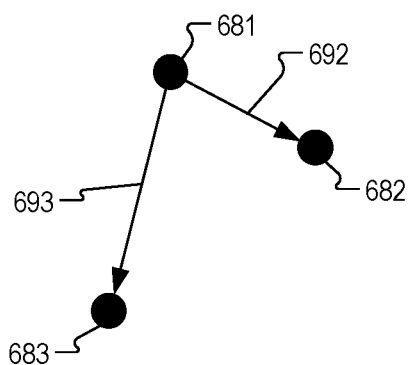

FIG. 6B illustrates that a difference vector 693 represents the color-shift from the calibrated color value 681 of the color reference point to the pixel values of the color reference point in a bluish illumination environment (e.g. illuminated with bluish CCFL light). Difference vector 691 represents the color-shift from the calibrated color value 681 of the color reference point to the pixel values of the color reference point in a reddish illumination environment. Those skilled in the art understand that a perception-matched color spaces such as CIECAM (International Commission on Illumination Color Appearance Model) or other suitable perception-matched color space may also be utilized to compute color differences instead of diagram 600, in accordance with aspects of this disclosure.

Referring again to FIG. 5, overlaid image adjustment engine 545 is configured to receive overlaid image(s) 241 and generate adjusted overlaid images 542. Overlaid image adjustment engine 545 may generate a color space adjustment map to apply to overlaid images 241 in generating the adjusted overlaid images 542 that adjusts the image color of at least a portion of overlaid images 241. In some embodiments, overlaid image adjustment engine 545 may determine these difference vectors and adjust the image color of overlaid images 241 based on the determined difference vector. For example, a green pixel value 690 of an overlaid image 241 may be adjusted down to pixel value 696 based on difference vector 693 to simulate the illumination of the overlaid image by the same color of bluish-white light that is illuminating the color reference point. Similarly, a green pixel value 690 of an overlaid image 241 may be adjusted down to pixel value 697 based on difference vector 692 to simulate the illumination of the overlaid image by the same color of reddish-white light when sunlight is illuminating the color reference point, for example. In one embodiment, generating adjusted overlaid image 542 includes correcting a white point of overlaid image 241 by way of chromatic adaptation according to a 3×3 matrix transform to relate a white point from the overlaid image 241 to a different white point to generate adjusted overlaid image 542. Hence, there are a variety of techniques that could be utilized in a chromatic adaptation process that is spatially variant accounting to inputs from an external sensor such as sensor 447.

Figure 7A:
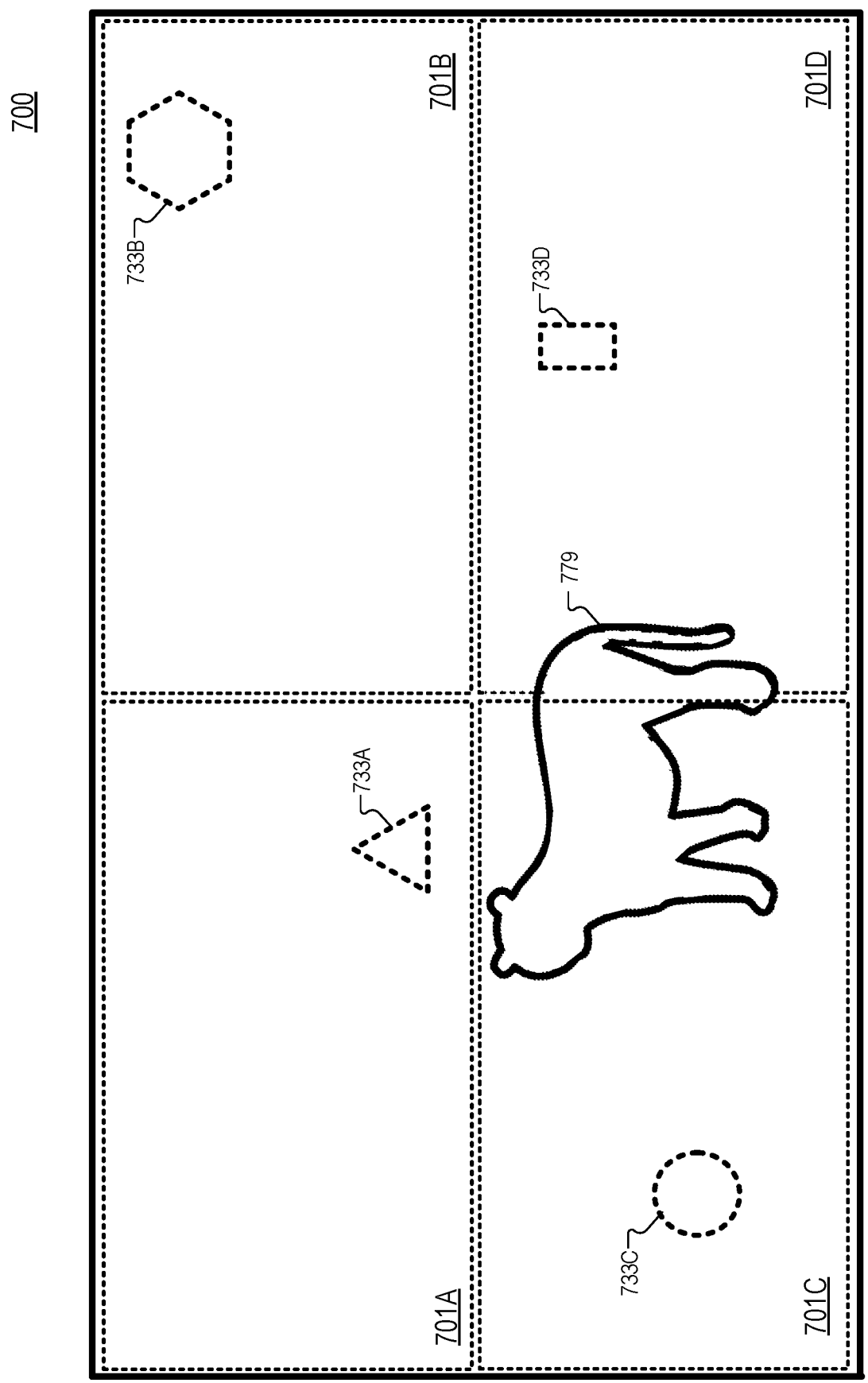
FIGS. 7A and 7B illustrates an example scene image having different reference zone and an example adjusted overlaid image having adjusted zones, in accordance with an embodiment of the disclosure.
Figure 7B:
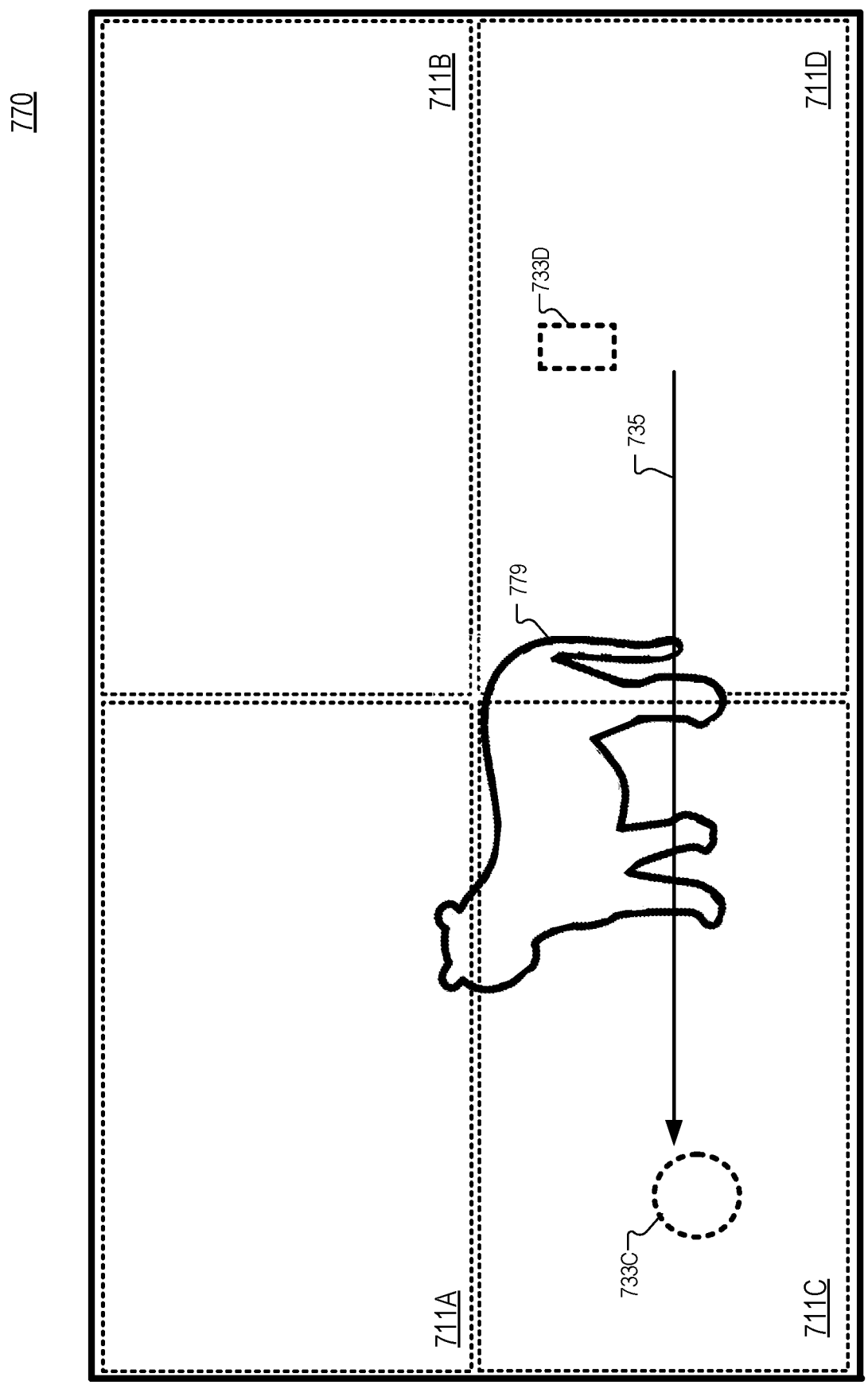

FIG. 7A illustrates an example scene image 700 having different reference zones, in accordance with an embodiment of the disclosure. Scene image 700 may approximate a user's field-of-view (FOV) looking into the real-world scene through an HMD. In the illustrated example, scene image 700 is divided into different reference zones 701A-D. More than four zones are possible. There may be six, eight, sixteen or any number of zones. FIG. 7B illustrates an example adjusted overlaid image having adjustment zones 711 corresponding with, and having the same number as, reference zones 701, in FIG. 7A.

In one embodiment, a color reference point 733 is identified in each reference zone 701 of scene image 700. Then an overlay zone of overlaid image 770 can be adjusted zone-by-zone according to the color reference points in reference zones 701. An overlay zone 779 (e.g. outline of a tiger) of the real-world scene may be identified that the overlaid image (e.g. 379) will occupy. Overlay zone 779 overlays adjustment zones 711A, 711C, and 711D that correspond with reference zones 701A, 701C, and 701D, respectively. The portion of overlay zone 779 that is in zone 711A may therefore be adjusted according to the pixel values of color reference point 733A in reference zone 701A. Similarly, the portion of overlay zone 779 that is in zone 711C may therefore be adjusted according to the pixel values of color reference point 733C in reference zone 701C and the portion of overlay zone 779 that is in zone 711D may therefore be adjusted according to the pixel values of color reference point 733D in reference zone 701D. In the example scene 300 of FIG. 3, the tail end of the overlaid tiger in zone 711D may be adjusted toward more blue chromaticity to account for the CCFL illumination and the forward body and head of the tiger in zone 711C may be adjusted toward more red chromaticity to account for the sunlight illumination. The difference vectors described in FIGS. 6A and 6B may be utilized to adjust the color of the tiger of the overlaid image according to the pixel values (in a scene image) of the color reference points 733C and 733D. Notably, the different zones 701 may vary with time such that a spatio-temporally variant chromatic adaptation technique is utilized, in accordance with some aspects of the disclosure.

In one embodiment, the color reference point 733 that is closest to the overlay zone 779 is utilized in generating a color space adjustment map that is applied to overlaid images for image color adjusting purposes. In FIG. 7A, color reference point 733A may be used to adjust the image color of the entire overlaid image.

Figure 8:
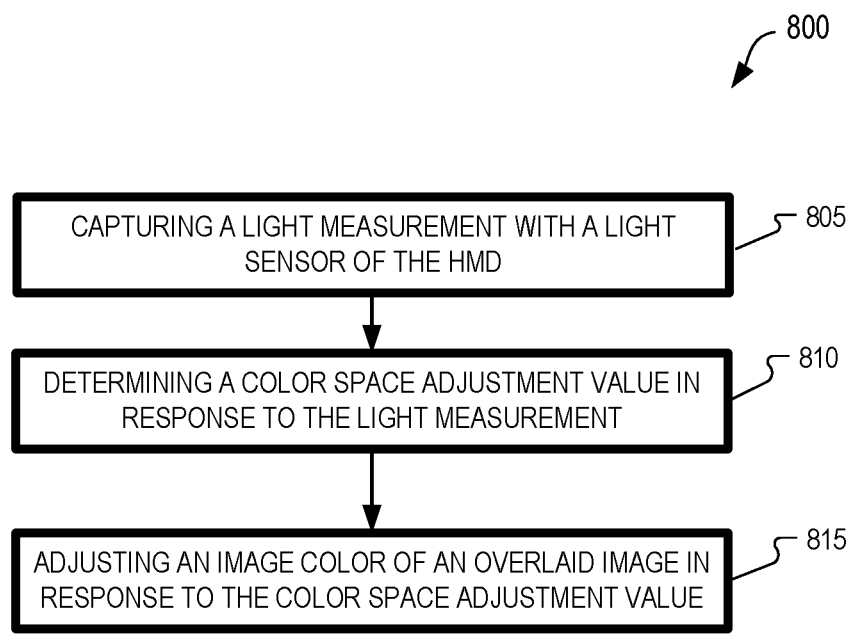
FIG. 8 illustrates an example flowchart of a process of color adjusting an overlaid image, in accordance with an embodiment of the disclosure.

FIG. 8 illustrates an example flowchart of a process 800 of color adjusting an overlaid image, in accordance with aspects of the disclosure. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel.

In process block 805, a light measurement is captured with a light sensor of an HMD. The light sensor may be a photodiode and color filter based color-sensor chip or an image sensor, for example. The light measurement may be a scene image or an analog or digital value providing chromaticity.

In process block 810, a color space adjustment value is determined in response to the light measurement.

In process block 815, an image color of at least a portion of an overlaid image is adjusted in response to the color space adjustment value. The overlaid image is generated by a display (e.g. display 250) of an HMD (e.g. HMD 100 or 400) and overlaid with real-world scenes viewable to a user of the HMD.

In some embodiments of process 800, the HMD includes a color reference object (e.g. color reference object 133) configured to direct the scene light to the light sensor and determining the color space adjustment value in response to the light measurement includes comparing a calibrated color value of the color reference object to the light measurement of the color reference object when the color reference object of the HMD is illuminated with the scene light.

In some embodiments of process 800, the light sensor includes an image sensor and the image sensor is oriented to capture a scene image that includes a color reference object included in the HMD. In other words, the color reference object (e.g. 133) may be included in a portion of a scene image. Color reference object 133 may be strategically disposed on the very edge of a field of view of a camera that includes an image sensor so that images captured by the image sensor include both the color reference object and the real-world scene. Determining the color space adjustment value in response to the light measurement may include identifying a color reference point in the scene image and determining a difference vector between pixel values of the color reference point in the scene image and a calibrated color vale of the color reference point as the color space adjustment value. The image color of (at least a portion of) the overlaid image is then adjusted based on the difference vector. In some embodiments of process 800, the light sensor is not an image sensor and may merely include three photodiodes with 3 different color filters disposed over the 3 photodiodes. The three color filters may be matched to a human color matching function (CMF) such as a CMF 10-deg, for example.

In some embodiments of process 800, adjusting the image color includes adjusting sub-pixel values (e.g. RGB subpixel values) of the overlaid image based on the color space adjustment value.

In an embodiment of process 800, the display of the HMD includes a first, second, and third light source (e.g. RGB LED or RGB laser source) and adjusting the image color includes adjusting an intensity of at least one of the first, second, or third light source based on the color space adjustment value.

FIG. 9 illustrates an example flowchart of a process 900 of color adjusting an overlaid image from color reference points, in accordance with aspects of the disclosure. The order in which some or all of the process blocks appear in process 900 should not be deemed limiting. Rather, one of ordinary skill in the art having the benefit of the present disclosure will understand that some of the process blocks may be executed in a variety of orders not illustrated, or even in parallel. The process blocks of process 900 may be executed using processing logic included in HMD or be executed on a computing system that is remote from an HMD but accessible over a network.

In process block 905, a scene image of a real-world scene is received.

In process block 910, at least one color reference point in the scene image is identified. Example color reference points may include color reference points 333A, 333B, 733A, 733B, 733C, or 733D. Example color reference points may include a stop sign, a yield sign. Color reference points may include signage (e.g. road signs) or brand logos that have consistent colors, for example. Example color reference points may include jewelry, outlet covers, table tops, soccer balls, or skin tones of a user or other persons in a scene image. Example color reference points may include clothing or shoes. In one embodiment, a color reference point includes the white of the human eye (sclera) and the color reference point is identified by matching portions of scene images to an existing database of eye images that include the sclera. A sensor that captures a real-world scene may have to undergo a calibration procedure in a production process in order to be utilized in process 900. The sensor may include three color filters that are matched to a human color matching function (CMF) such as a CMF 10-deg, for example.

In process block 915, a color space adjustment map is generated for an overlaid image utilizing the at least one color reference point. Generating a color space adjustment map may include generating difference vectors or other color adjustment techniques described in the disclosure.

In process block 920, the color space adjustment map is applied to the overlaid image to adjust an image color of at least a portion of the overlaid image. The adjusted overlaid image is to be overlaid with real-world scenes viewable by a user of an HMD.

Some embodiments of process 900 further includes identifying an overlay zone (e.g. 779) of the real-world scene that the overlaid image will occupy and selecting a closest color reference point (e.g. 733A) from the plurality of identified color reference points. The closest color reference point (calculated in Euclidean coordinates with reference to a perception-matched color space, for example) is then utilized in generating the color space adjustment map. The pixel values of the closest color reference point may be used to generate a difference vector to adjust the pixel values of the overlaid image, for example.

In an embodiment of process 900, identifying the at least one color reference point includes identifying a first color reference point (e.g. 733C) and a second color reference point (e.g. 733D). Then generating the color space adjustment map for the overlaid image includes determining a first difference vector between first pixel values of the first color reference point and a first calibrated color value of the first color reference point and identifying a second difference vector between second pixel values of the second color reference point and a second calibrated color value of the second color reference point. Then generating the color space adjustment map includes generating a blending vector for the color space adjustment map between the first color reference point and the second color reference point based on the first difference vector and the second difference vector. The blending vector gradually transitions the image color of a transition portion of the adjusted overlaid image to be overlaid between the first color reference point and the second color reference point. Using FIG. 7B as an example, blending vector 735 may blend a blue light adjustment determined by reference color point 733D to a red light adjustment determined by reference color point 733C. The blending function may be linear or non-linear. With the blending vector 735 included in the color space adjustment map, the tail of the tiger in the overlaid image may be red-light compensated, gradually transitioning into a blue-light compensation at the chest and head of the tiger, for example.

In one embodiment, of process 900, identifying the at least one color reference point includes matching points in the real-world scene to a known color reference point included in an array of prior photos that are accessible to a user of the HMD. For example, an image of a family member may have a particular garment that was imaged in a known lighting environment (e.g. sun in clear sky). Again, a sensor that captures a real-world scene may have to undergo a calibration procedure in a production process in order to be utilized in this embodiment of process 900.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 240 or 540) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels (e.g. X1) may include or be routed through one or more wired or wireless communication utilizing IEEE 802.11 protocols, BlueTooth, SPI (Serial Peripheral Interface), FC (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A device comprising:
   a display configured to generate overlaid images for overlaying with real-world scenes;
   a light sensor configured to capture a light measurement of scene light from an external environment of the device, wherein the light sensor includes an image sensor oriented to capture a scene image as the light measurement; and
   processing logic configured to:
      determine a color space adjustment value in response to the light measurement;
      generate adjusted overlaid images by adjusting an image color of at least a portion of the overlaid images in response to the color space adjustment value; and
      drive the display to present the adjusted overlaid images overlaid with the real-world scenes,
   wherein the determining the color space adjustment value in response to the light measurement includes:
      identifying a color reference point in the scene image; and
      determining a difference vector between pixel values of the color reference point in the scene image and a calibrated color value of the color reference point as the color space adjustment value, wherein the image color of the at least a portion of the overlaid image is adjusted based on the difference vector.

2. The device of claim 1, wherein identifying the color reference point includes identifying a whitest object in the scene image, and wherein the calibrated color value is a white color reference point.

3. The device of claim 1, wherein the processing logic is configured to receive the light measurement from the light sensor.

4. The device of claim 1, wherein the device is a head mounted display (HMD).

5. A computer-implemented method comprising:
   capturing a light measurement with a light sensor of a head mounted display (HMD) configured to receive scene light from an external environment of the HMD;
   determining a color space adjustment value in response to the light measurement;
   generating an adjusted overlaid image by adjusting an image color of at least a portion of an overlaid image in response to the color space adjustment value; and
   driving a display of the HMD to present the adjusted overlaid image overlaid with real-world scenes viewable to a user of the HMD,
   wherein the light sensor includes an image sensor and the image sensor is oriented to capture a scene image that includes a color reference object included in the HMD, the light measurement including the scene image,
   and wherein determining the color space adjustment value in response to the light measurement includes:
      identifying a color reference point in the scene image; and
      determining a difference vector between pixel values of the color reference point in the scene image and a calibrated color value of the color reference point as the color space adjustment value, wherein the image color of the at least a portion of the overlaid image is adjusted based on the difference vector.

6. The computer-implemented method of claim 5, wherein adjusting the image color includes adjusting sub-pixel values of the overlaid image based on the color space adjustment value.

7. The computer-implemented method of claim 5, wherein the display includes a first, second, and third light source, and wherein adjusting the image color includes adjusting an intensity of at least one of the first, second, or third light source based on the color space adjustment value.

8. A computer-implemented method comprising:
receiving a scene image of a real-world scene;
identifying an overlay zone of the real-world scene that an overlaid image will occupy;
identifying at least one color reference point in the scene image of the real-world scene;
selecting a closest color reference point from the at least one color reference point that is closest to the overlay zone;
generating a color space adjustment map for the overlaid image utilizing the closest color reference point;
applying the color space adjustment map to the overlaid image to generate an adjusted overlaid image by adjusting an image color of at least a portion of the overlaid image; and
driving a display to present the adjusted overlaid image to be overlaid with real-world scenes viewable by a user.

9. The computer-implemented method of claim 8, wherein identifying the at least one color reference point includes matching objects in the real-world scene to a known color reference object included in an array of prior photos that are accessible to a user.

10. The computer-implemented method of claim 8, wherein the color reference point includes a sclera.

11. The computer-implemented method of claim 8, wherein the scene image is captured by a front-facing camera of a head mounted display.

* * * * *